United States Patent [19]

Suter

[11] Patent Number: 4,710,199

[45] Date of Patent: Dec. 1, 1987

[54] METHOD OF DYEING AN OPTICAL ARTICLE

[75] Inventor: Hans R. Suter, Wangen, Switzerland

[73] Assignee: Roag (AG), Illnau, Switzerland

[21] Appl. No.: 864,716

[22] Filed: May 19, 1986

Related U.S. Application Data

[63] Continuation-in-part of Ser. No. 740,851, Jun. 3, 1985, abandoned.

[51] Int. Cl.⁴ ................................................. D06P 5/00
[52] U.S. Cl. .......................................... 8/507; 351/159
[58] Field of Search ...................... 8/506, 507; 351/160

[56] References Cited

U.S. PATENT DOCUMENTS 4,442,788 4/1984 Weis .................................... 118/405

Primary Examiner—Paul Lieberman
Assistant Examiner—John F. McNally
Attorney, Agent, or Firm—Warren B. Kice

[57] ABSTRACT

A method of dyeing an optical article in which the article is immersed in a dyeing solution which is heated and subjected to ultrasonic energy. The article is immersed for a time span commensurate with the desired tint or hue after which the article is cleaned and dried. As a result, eyeglass lenses made of a plastic material, or mineral glass, can be produced at a reproducible quality of dye and color gradient.

4 Claims, No Drawings

METHOD OF DYEING AN OPTICAL ARTICLE

CROSS REFERENCE TO RELATED APPLICATIONS

This application is a continuation-in-part of application Ser. No. 740,851, filed June 3, 1985 now abandoned.

BACKGROUND OF THE INVENTION

The present invention relates to a method of dyeing an optical article by immersing the article to be dyed in a dyeing solution, applying heat energy to the bath, maintaining the optical article immersed until the desired tint is obtained, removing the optical article from the bath, then rinsing and drying the article.

DESCRIPTION OF THE PRIOR ART

The technique of dyeing optical articles is generally known. A conventional method includes the steps of immersing the optical article into a tank containing a dyeing solution and maintaining such optical article immersed until the required tint or hue has been achieved. After removing the dyed optical article, it is rinsed and thereafter dried. The immersing is done by means that permit the depth and duration of immersion to be controlled.

When utililizing such dyeing methods including methods utilizing a dye dissolved in water, the homogeneity of the dyeing solution will change after an extended time span and the dye in the dyeing tank will sink and settle. In these cases effectiveness of the dyeing solution depends solely on its affinity to the surface area of the optical article.

SUMMARY OF THE INVENTION

It is a general object of the invention to provide a method of dyeing an optical article in which the dyeing solution is applied more intensively onto the surface of the article, and in which the molecular exchange during the dyeing is improved and the natural film of grease present on the mineral or plastic lenses is eliminated.

A further object is to provide a method of dyeing an optical article in which the dyeing solution bath is subjected to an ultrasonic energy for improving the dyeing process.

The advantages of the invention include a reduction of the time span needed for dyeing the optical articles, and an increase in the intensity of the coloring such that, during a subsequent ultrasonic cleaning prior to the coating of the optical articles, a reduction in the density of the dye is prevented.

DESCRIPTION OF THE PREFERRED EMBODIMENT

In practicing the method according to the invention a tank is filled with a conventional dyeing solution consisting basically of a dye and water. The dyeing solution is then heated and, either simultaneously or after expiration of a set time, is subjected to ultrasonic energy to improve the intermixing of the dyeing solution and to prevent a settling of the dye in the water.

The tank holding the dyeing solution is made of metal and preferably stainless steel. An ultrasonic vibrating apparatus is fixedly mounted to the bottom of the tank such that the ultrasonic vibrations are transmitted to the dyeing solution with no loss. The vibrating apparatus can consist of an ultrasonic energy generator generally available in the market. The transducer is mounted by an adhesive agent to the outer surface of the bottom of the tank, it being understood that other mounting techniques can be utilized such as welding, soldering, or riveting. The frequency of the oscillations is preselected within a frequency range so that the only control on the vibrating apparatus is an on-off switch. Other structural alternatives could be a dip-tube transducer inserted in the bath, or an annular shaped transducer surrounding the cylindrical tank and fixedly mounted thereto by an adhesive agent.

In the present invention each dyeing tank, preferably of cylindrical shape, is surrounded by an aluminum jacket split along a line forming the generatrix of the cylinder. Thus the aluminum jacket, in its flattened state before being wrapped around the tank, is of a substantially rectangular shape. A heat conducting paste is placed between the aluminum jacket and the outer wall of the tank. The aluminum jacket is connected at the narrow sides, if viewed in an unwrapped condition of the rectangle, to the plus and minus electrical current wires and thus functions as a resistance heater. The thermostat for controlling the temperature is a contact type and is inserted vertically between the tank and the aluminum jacket. The tank may have a vertical outside groove for receiving the thermostat. The thermostat controls the current to the aluminum jacket by opening or closing the power switch, which can be in the form of a relay, so that the thermostat controls the temperature in a predetermined range. The aluminum jacket can be considered as a heating plate wrapped around the tank, and when viewed in cross section the aluminum jacket has a shape similar to the Latin letter "omega". The two ends of the circular part of the omega are adjacent to each other but are separated by an electrical insulator. Inside the circle is the tank and the two opposite ears forming the feet section of the omega are the connectors to the electrical wires.

According to a preferred embodiment the aforementioned oscillating frequency is between 25,000 hertz and 60,000 hertz, and the aforementioned temperature range is at least 70° C. and varies by no more than 2° C.

The optical articles to be dyed such as, for example, eyeglass lenses made of plastic material, are arranged in lens holders, and thereafter immersed into the dyeing solution. The ultrasonic energy acting on the dyeing solution destroys the grease film coating on the plastic lenses and permits a more intense application of the dye onto the surface area of the immersed lens. Also, the ultrasonic energy improves the molecular exchange during the dyeing process.

The optical articles being dyed are left immersed in the dyeing solution during a time span commensurate with the formation of the desired tint or hue. This can be achieved by using known apparatuses that allow the time span and depth of immersion to be controlled and adjusted.

By means of the method of the present invention the dyeing process is such that the dyeing layer or coating as well as the dye gradient, are reproducible. Contrary to known methods in which the dyeing process depends on the condition of the dyeing solution and the optical articles being dyed, and in which the dyeing gradient may differ per time span of immersion, the method of the present invention allows the same respective color gradient to be obtained per time span of immersion.

This considerably improves the quality of the dyed optical article.

While there has been described a present preferred embodiment of the invention, it is to be understood that the invention is not limited thereto, but maybe otherwise variously embodied and practiced within the following claims.

What is claimed is:

1. A method of dyeing an optical article of plastic, comprising the steps of immersing said article in a dyeing solution in a tank, subjecting said dyeing solution to heating energy exclusively via a side wall of said tank, and to ultrasonic energy via the bottom wall of said tank, said ultrasonic energy having a frequency range of 25,000 to 60,000 hertz to excite the particles of dye continuously within the dyeing solution and to constantly and consistantly agitate said solution, maintaining said article in said solution until the desired tint is obtained, removing the article from the solution and then rinsing and drying the article.

2. The method of claim 1 further comprising the step of regulating said heating energy and said ultrasonic energy to maintain the temperature of said solution within a predetermined range.

3. The method of claim 3 wherein said range is ±2° C.

4. The method of claim 3 wherein said temperature is at least 70° C.

* * * * *